United States Patent [19]
Watanabe

[11] 4,356,524
[45] Oct. 26, 1982

[54] MAGNETIC HEAD

[75] Inventor: Seizo Watanabe, Hachioji, Japan

[73] Assignee: Olympus Optical Company Ltd., Tokyo, Japan

[21] Appl. No.: 159,827

[22] Filed: Jun. 16, 1980

[30] Foreign Application Priority Data

Jul. 27, 1979 [JP] Japan .................................. 54/93900

[51] Int. Cl.³ ............................ G11B 5/10; G11B 5/22
[52] U.S. Cl. ..................................... 360/129; 360/122
[58] Field of Search ............... 360/129, 128, 124, 122, 360/121, 125, 132

[56] References Cited

U.S. PATENT DOCUMENTS

| | | | |
|---|---|---|---|
| 3,548,393 | 12/1970 | Montel | 360/129 |
| 3,603,941 | 9/1971 | Koorneef | 360/129 |
| 3,767,209 | 10/1973 | Seehawer | 360/129 |
| 4,117,523 | 9/1978 | Masuda | 360/129 |
| 4,137,555 | 1/1979 | Sveceny | 360/129 |
| 4,266,256 | 5/1981 | Kato | 360/128 |
| 4,285,020 | 8/1981 | Sato | 360/132 |

Primary Examiner—Robert M. Kilgore
Attorney, Agent, or Firm—Weinstein & Sutton

[57] ABSTRACT

A magnetic head comprises a core holder for holding a magnetic head element and including a first conductive region which is adapted to bear against the magnetic head element, and a shielding case which defines a second conductive region adapted to bear against the first conductive region and covering both the magnetic head element and the core holder to provide a magnetic shielding. In this manner, any static electricity developed on a magnetic tape is conducted to the ground potential of an instrument in which the magnetic head is mounted through the first and the second conductive region.

6 Claims, 3 Drawing Figures

MAGNETIC HEAD

BACKGROUND OF THE INVENTION

The invention relates to a magnetic head, and more particularly, to a magnetic head which provides an electrical conduction of static electricity which may be developed on a magnetic tape, to a ground potential.

As is well recognized, a magnetic tape such as an evaporated tape, commonly referred to as metal tape, has recently been developed which utilizes an electrically conductive, magnetic film which improves the performance thereof. However, a tape constructed in this manner suffers from the disadvantage that noises may be caused by the discharge of static electricity which is produced as a result of oscillations of a tape cassette in which the tape is contained during the shipment or during a rapid tape advance and which occurs upon contact of the tape with a magnetic head during a record/playback operation to bring the magnetic surface of the tape into contact with or close to a tape guide integral with a shielding case of the head or any adjacent metallic member.

SUMMARY OF THE INVENTION

It is an object of the invention to eliminate the described disadvantage of the prior art by providing a magnetic head including a core holder which is formed with a first conductive region and also including a conductive shielding case which provides a magnetic shielding effect by covering the head element and the core holder and which represents a second conductive region, the arrangement being such that the first conductive region is disposed in contact with the second conductive region so that any static electricity developed on a magnetic tape may be released through the shielding case which is connected to a ground potential of an instrument.

In accordance with the invention, any static electricity which is developed on the magnetic tape is discharged through the first and the second conductive region, so that no noise is produced during a record/playback operation. In addition, the arrangement of the invention prevents any static electricity from being developed on the magnetic tape during its use, thus effectively eliminating the described disadvantage of the prior art.

DESCRIPTION OF THE PREFERRED EMBODIMENT

Figure 1:
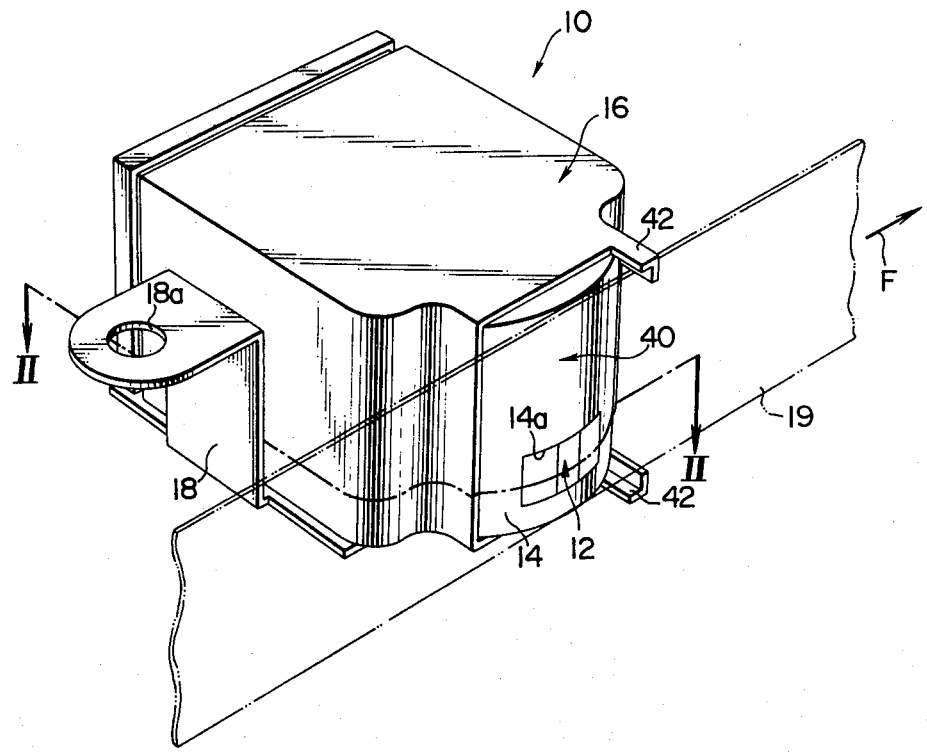
FIG. 1 is a perspective view of a magnetic head according to one embodiment of the invention.

Referring to FIG. 1, there is shown a magnetic head according to the invention which is generally designated by numeral 10 and which is encased in a shielding case 16. A core holder 14 is assembled within the casing 16, and magnetic head element 12 is retained therein by a fitting engagement therewith. The core holder 14 includes a front surface 40 in which a rectangular opening 14a is formed, through which the head element 12 is exposed. A magnetic tape 19 is driven past the head element so that its magnetic surface bears against the front surface 40 of the core holder 14 for the purpose of a recording/playback or erasure. The shielding case 16 is provided with a pair of vertically spaced and forwardly projecting tape guides 42 which extend beyond the front surface 40 of the core holder 14. The head 10 is fixedly mounted on a conductive support plate 18 formed with mounting holes 18a which may be utilized to connect it to the ground potential of an instrument, not shown, in which the head 10 is used so that the shielding case 16 is electrically connected with the ground potential.

Figure 2:
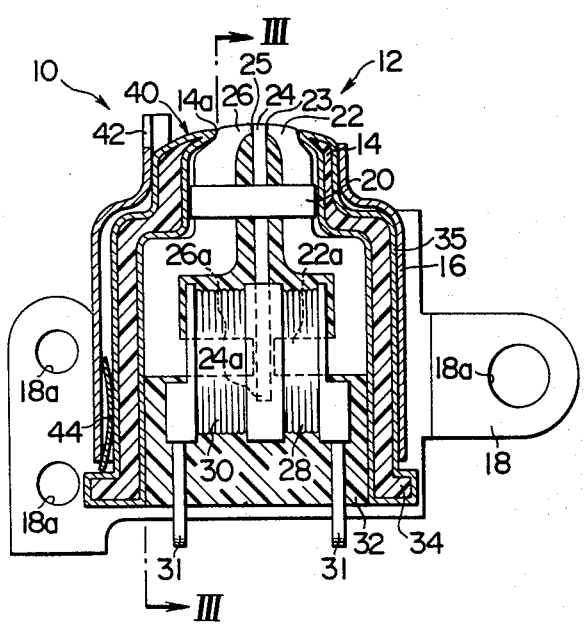
FIG. 2 is a cross section taken along the line II—II shown in FIG. 1.

Referring to FIG. 2 which shows the detail of the magnetic head 10, the core holder 14 assembled into the shielding case 16 includes a body 34 which is defined by a frame of a non-conductive material such as plastic. The entire surface of the frame is subjected to an electroless plating or a spraying of a conductive paint to form a conductive film which defines a first conductive region 35. The core holder 14 is internally formed with a hollow portion 32 in which a first, a second and third core 22, 24, 26, each formed of a lamination and bonded together by a metal band 20, are disposed to define the magnetic head element 12. An erasure gap 23 is formed between the free ends of the first and second cores 22, 24 while a record/playback gap 25 is formed between the free ends of the second and third cores 24, 26. Both of these gaps are exposed through the opening 14a in the core holder 14. The ends of the first to third cores 22, 24, 26 remote from the gaps 23, 25 are disposed in abutting relationship with each other, with the rear end 24a of the second core 24 centrally located and with the rear ends 22a, 26a of the first and third cores 22, 26 disposed on the opposite sides thereof. These rear ends are shown in broken lines. An erasure coil 28 and record/playback coil 30, both of which are disposed on respective coil bobbins, are mounted on the rear ends 22a, 26a of the first and second cores 22, 26, respectively. The individual ends of the cells 28, 30 are connected to four terminals 31.

In operation, when a current is passed through the erasure coil 28, the head element 12 operates as an erasure head by means of the erasure gap 23. In this instance, a magnetic flux will pass through the core 26, but such influence is cancelled by the application of a d.c. bias to the record/playback coil 30. On the other hand, when a d.c. bias is applied to the erasure coil 28 while a combination of a d.c. bias and a signal to be recorded is applied to the record/playback coil 30, the head element 12 operates as a record head by means of the record/playback gap 25. In addition, when the coil 30 is not energized, the head element 12 operates as a playback head by means of the record/playback gap 25.

Figure 3:
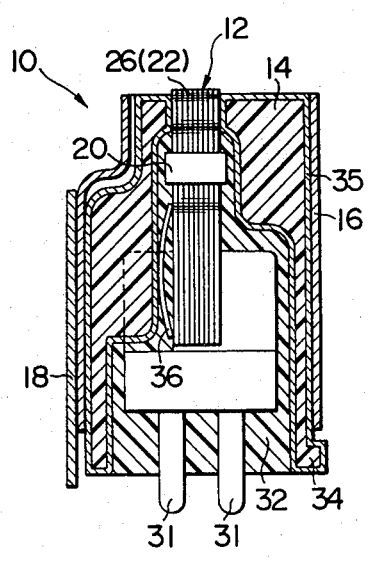
FIG. 3 is a cross section taken along the line III—III shown in FIG. 2.

FIG. 3 is a cross section taken along the line III—III shown in FIG. 2. As shown, a first leaf spring 36 which is formed of a conductive material is disposed between the first conductive region 35 defined on the surface of the core holder 14 and the first and third cores 22, 26 to provide an electrical interconnection therebetween. The spring 36 has a resilience of reduced magnitude. When the head element 12 is inserted into the hollow portion 32 defined within the core holder 14 and secured therein, the front end of the head element 12 is brought into tight contact with the first conductive region 35 in the area of the opening 14a, whereby the head element 12 and the first conductive region 35 are directly and electrically connected together.

The hollow portion 32 is filled with a non-conductive material such as plastics, which may be secured in place to hold the head element 12 within the core holder 14 while electrically insulating the both coils 28, 30.

The shielding case 16 is formed in a box-shaped configuration using a conductive and highly permeable material such as permalloy. It covers the top, the bottom and the both lateral sides of the core holder 14, thus preventing the magnetic flux produced by the head element 12 from leaking to the exterior and simultaneously preventing extraneous flux from entering the interior of the shielding case 16 to thereby avoid an adverse influence upon the head element 12.

As shown in FIG. 2, a second conductive leaf spring 44 is disposed between the core holder 14 and the shielding case 16, and resiliently bears against the first conductive region 35 and the shielding case 16 to provide an electrical interconnection therebetween. Thus, the shielding case 16 represents a second conductive region.

In use, during a record/playback operation performed on the magnetic tape, the tape will move across the front surface 40 of the core holder 14, the front surface of the head element 12 and the gaps 23, 25 while contacting them. As a consequence, any static electricity which is developed on the magnetic tape 19 will be discharged through the first conductive region 35 and the shielding case 16 which represents the second conductive region to the conductive support plate 18, and thence to the ground potential of the instrument in which the magnetic head is used. In this manner, no noise is produced as a result of operation of the magnetic tape 19.

It should be understood that the invention is not limited to the described embodiment. For example, instead of constructing the magnetic head element 12 as a combined erasure and record/playback head, it may be constructed as a single function head such as an erase head, a record head or a playback head. Alternatively, it may be constructed as a combined function head which performs any two functions of these three functions. Finally, it may be constructed as a stereophonic head.

The electrical instrument in which the magnetic head 10 is incorporated may be a cassette tape recorder of a miniature size, a cassette tape recorder which utilizes a tape cassette of the Philips type, a video tape recorder or a tape recorder of the open reel type.

Instead of forming the shielding case 16 itself as a second conductive region by forming it of a conductive material, an independent conductive member may be mounted on the shielding case 16 to serve as the second conductive region.

The ground potential of the instrument in which the magnetic head is incorporated may comprise a conductive wire connected to a chassis which is contacted by the conductive support plate 18.

In addition, instead of forming the core holder 14 as comprising the body 34 of non-conductive plastic material and the first conductive region 35 in the form of the conductive film which is formed by an electroless plating or spraying of a conductive paint over the entire surface of the body 34, the body 34 may be formed of a conductive material to serve as the first conductive region without providing the conductive film.

However, when the core holder 14 comprises the non-conductive body 34 and the conductive film which defines the first conductive region 35, an abrasion or exfoliation of a magnetic film from the magnetic tape 19 can be reduced as such magnetic film bears against the front surface 40 of the core holder 14 while running in the direction of an arrow F at a given speed. Such abrasion or exfoliation will be substantial in an arrangement in which the core holder is itself formed of a conductive metal to serve as the first conductive region. Thus the useful life of the magnetic tape 19 can be increased by the combination of the non-conductive body and the conductive film.

What is claimed is:

1. A magnetic head, comprising:
    a magnetic head element including a core having a magnetic gap defined therein and a coil disposed on the core, the gap serving a record/playback or erasure operation;
    a core holder for holding the magnetic head element, the core holder including a first conductive region which is integrally formed with and encloses a non-conductive member and which is adapted to bear against the magnetic head element; and
    a shielding case defining a second conductive region which bears against said first conductive region, the case covering the magnetic head element and the core holder to provide magnetic shielding;
    the arrangement being such that as the magnetic head element is engaged by a magnetic tape which has a conductive area, any static electricity developed on the magnetic tape is discharged through the first and the second conductive regions.

2. A magnetic head according to claim 1 in which the first conductive region is formed on the total surface of the core holder by electroless plating or spraying of a conductive paint.

3. A magnetic head according to claim 1 in which the shielding case comprises a conductive member.

4. A magnetic head according to claim 1, further including a first conductive leaf spring disposed between the magnetic head element and the core holder to bear against the both elements resiliently to provide an electrical interconnection therebetween.

5. A magnetic head according to claim 1, further including a second conductive leaf spring disposed between the core holder and the shielding case to bear against the both elements resiliently to provide an electrical interconnection therebetween.

6. A magnetic head, comprising:
    a magnetic head element including a core having a coil disposed thereon;
    a core holder for holding the magnetic head element; said core holder including a first conductive member in contact with said magnetic head element and said first conductive member encloses an internal body portion formed of non-conductive material;
    a second conductive member in contact with said first conductive member, said second conductive member providing a magnetic shield for said magnetic head element and said core holder, so that when the magnetic head element is engaged by a magnetic tape which has a conductive area, any static electricity developed on said magnetic tape is discharged through said first conductive member and said second conductive member.

* * * * *